Patented Dec. 7, 1937

2,101,534

UNITED STATES PATENT OFFICE 2,101,534

UREA-FORMALDEHYDE CONDENSATION PRODUCTS

Donald Edwards Edgar, Philadelphia, Pa., assignor to E. I. du Pont de Nemours & Company, Wilmington, Del., a corporation of Delaware No Drawing. Application August 1, 1935, Serial No. 34,300

1 Claim. (Cl. 260—3)

This invention relates to condensation products of urea and formaldehyde, and more particularly to an improved procedure for preparing dimethylol urea in a physical condition more satisfactory for further use.

The reaction product of urea and aqueous formaldehyde ordinarily precipitates as a white crystalline solid which is readily soluble in water. The bulk of the aqueous material is usually removed by filtration and the white crystalline precipitate is then dried usually at ordinary room temperatures or at elevated temperatures under controlled conditions. The drying of the crystalline mass offers difficulties in that the crystals cake in hard lumps which delays the drying time considerably, thus making the operation inefficient. This caking of the crystals is probably due to the cementing action of the dissolved portion of the crystals from which the aqueous material has not been completely removed during the filtering operation. The material thus produced in hard lumps and cakes presents difficulties for further use, requiring grinding and screening or sieving. The material thus prepared is often not thoroughly dry and must be re-dried after grinding and screening.

This invention has as an object the provision of an improved procedure for preparing the reaction product of urea and formaldehyde. A further object is the provision of an improved procedure for preparing dimethylol urea in a physical condition in which it will be more satisfactory for further immediate use. A further object is the provision of an improved method for the preparation of dimethylol urea which will obviate the necessity of the use of drastic grinding procedures to place the material in condition for further use, and which will produce a material of uniform quality and relatively uniform physical condition. Other objects will appear hereinafter.

These objects are accomplished by removing as much water from the crystalline precipitate as is practical by filtration, breaking the resulting cake into small pieces, treating with a liquid miscible with water but a non-solvent for the urea-formaldehyde reaction products, filtering and drying.

The following example is illustrative of a preferred embodiment of the invention:

Example

| | Grams |
|---|---|
| Formaldehyde (37% aqueous solution) | 1540 |
| Urea | 540 |

To the aqueous formaldehyde solution is added sodium acid phosphate ($NaH_2PO_4$) as a buffer. The hydrogen ion concentration of the solution is then adjusted to a pH value of 7.6 by the addition of sodium hydroxide solution using Phenol Red as an indicator and comparing with standard color tubes. The urea is then dissolved in the formaldehyde solution thus prepared. The liquid is kept at a temperature of below 25° C., and preferably not below 15° C., by any suitable means and allowed to stand for at least 48 hours or until complete precipitation of the reaction product has taken place. Precipitation usually begins after about 12 hours' standing. When the precipitation is complete the crystalline material is removed by filtration. The crystalline mass is then treated with ethyl alcohol to form a slurry and again filtered to remove the alcohol. This operation is preferably carried out two times. After the last treatment and removal of as much alcohol as possible by filtration the material may be dried by any convenient means either at room temperature or at a slightly elevated temperature. The crystalline mass thus prepared dries completely and thoroughly and results in a fluffy material substantially free from any lumps and caking.

Instead of aqueous formaldehyde I may use para-formaldehyde. In this case the urea is dissolved in water and the para-formaldehyde added as a solid.

In place of the ethyl alcohol which is used to wash the crystalline mass after filtration, methyl, propyl, butyl or other similar aliphatic alcohols as well as such materials as acetone, ethyl ether of ethylene glycol, methyl ether of ethylene glycol and similar materials may be used, the principal requirement being that the liquid is miscible with water.

If desired the crystalline mass, after the alcohol treatment, may be treated with a liquid which is miscible with the alcohol used and which does not react with the product of the reaction of urea and formaldehyde. Among such liquids may be mentioned the aromatic hydrocarbons such as benzol, toluol and xylol, and aliphatic hydrocarbons as petroleum ether, gasoline, naphthas and the like.

The washing with alcohol may be repeated any number of times as may be found practical. A convenient modification for the washing of the crystalline mass may comprise centrifuging in a basket type centrifuge and after the bulk of the aqueous material is removed spraying with the liquid to remove the remaining aqueous material as may adhere to the crystalline mass. Many variations in this respect will be readily apparent to those skilled in the art. While the hydrogen ion concentration given in the example above is noted as 7.6, this may conveniently range between 6 and 9, yielding equally satisfactory results and without departing from the spirit of the invention.

The material produced according to the procedure of the invention may be advantageously adapted for use as a molding material, as such, according to methods well known in the art. Further, the material may be adapted for use as a film-forming composition for particular purposes either alone or in combination with other synthetic resins and/or suitable softening agents.

This invention presents as a principal advantage a method for producing the reaction product of urea and formaldehyde, which can be more readily and efficiently dried after the removal of the aqueous liquid by filtration and which does not substantially cake or harden into lumps on drying. The reaction product of urea and formaldehyde produced in accordance with the present invention is more stable than material produced by present procedures, i. e. dried directly after filtration. The product made by my improved method, as compared to the urea-formaldehyde reaction product as conventionally made, is also in a much more suitable physical condition for further use where it may be desired to dissolve it or react with other materials without subjecting it to drastic grinding procedures before such use is practical.

As many apparently widely different embodiments of this invention may be made without departing from the spirit and scope thereof, it is to be understood that I do not limit myself to the specific embodiments thereof except as defined in the appended claims.

I claim:

In the manufacture of urea-formaldehyde reaction products the steps which comprise reacting the urea and formaldehyde in aqueous solution thereby obtaining in caked form a crystalline precipitate of said reaction product in aqueous liquor which is a non-solvent for the precipitated reaction product, separating substantially all said aqueous liquor from the crystalline caked precipitate, breaking the resulting cake into small pieces, then forming a slurry of said precipitate with a water miscible liquid which is selected from the class consisting of acetone and alcohols and which is a non-solvent for said precipitate, separating said precipitate from the non-solvent, and completely drying the precipitate thereby obtaining said urea-formaldehyde reaction product in a fluffy form substantially free from lumps and caked particles.

DONALD EDWARDS EDGAR.